United States Patent [19]

Rodney et al.

[11] Patent Number: 4,665,511
[45] Date of Patent: May 12, 1987

[54] SYSTEM FOR ACOUSTIC CALIPER MEASUREMENTS

[75] Inventors: Paul F. Rodney; James R. Birchak, both of Houston, Tex.

[73] Assignee: NL Industries, Inc., New York, N.Y.

[21] Appl. No.: 595,327

[22] Filed: Mar. 30, 1984

[51] Int. Cl.$^4$ ............................................... G01V 1/00
[52] U.S. Cl. ........................................ 367/35; 367/27; 73/152
[58] Field of Search ............... 367/25, 27, 35, 911; 33/302, 303; 175/40, 50; 73/152

[56] References Cited

U.S. PATENT DOCUMENTS

| | | | |
|---|---|---|---|
| 2,596,023 | 5/1952 | Goble et al. | 73/152 X |
| 3,257,639 | 6/1966 | Kokesh | 367/33 X |
| 3,330,374 | 7/1967 | Broussard et al. | 367/35 X |
| 3,430,726 | 3/1969 | Smith et al. | 367/25 |
| 3,786,894 | 1/1974 | Lebreton | 367/25 X |
| 3,835,953 | 9/1974 | Summers | 367/27 |
| 3,961,683 | 6/1976 | Delignieres | 367/27 X |
| 4,130,816 | 12/1978 | Vogel et al. | 367/35 |
| 4,131,875 | 12/1978 | Ingram | 367/35 |
| 4,520,468 | 5/1985 | Scherbatskoy | 367/85 |

Primary Examiner—Charles T. Jordan
Assistant Examiner—John W. Eldred
Attorney, Agent, or Firm—Browning, Bushman, Zamecki & Anderson

[57] ABSTRACT

The present invention relates to an apparatus and method for calipering a borehole using acoustic measurements within the borehole. These acoustic measurements are useful for measuring the reflectivity of the side walls of a borehole and for calipering a borehole in a wireline or measurement while drilling configuration. The apparatus comprises at least one acoustic transceiver disposed on a calipering tool, together with a second acoustic receiver disposed longitudinally a selected distance from the first receiver. Further, a second acoustic transceiver is disposed on the caliper tool azimuthally from the first transceiver. Measurement of the travel times of acoustic pulses reflected from the borehole walls by the transceivers and receivers of this device, together with other known data, permits an accurate caliper of the borehole to be produced.

4 Claims, 3 Drawing Figures

U.S. Patent  May 12, 1987  4,665,511
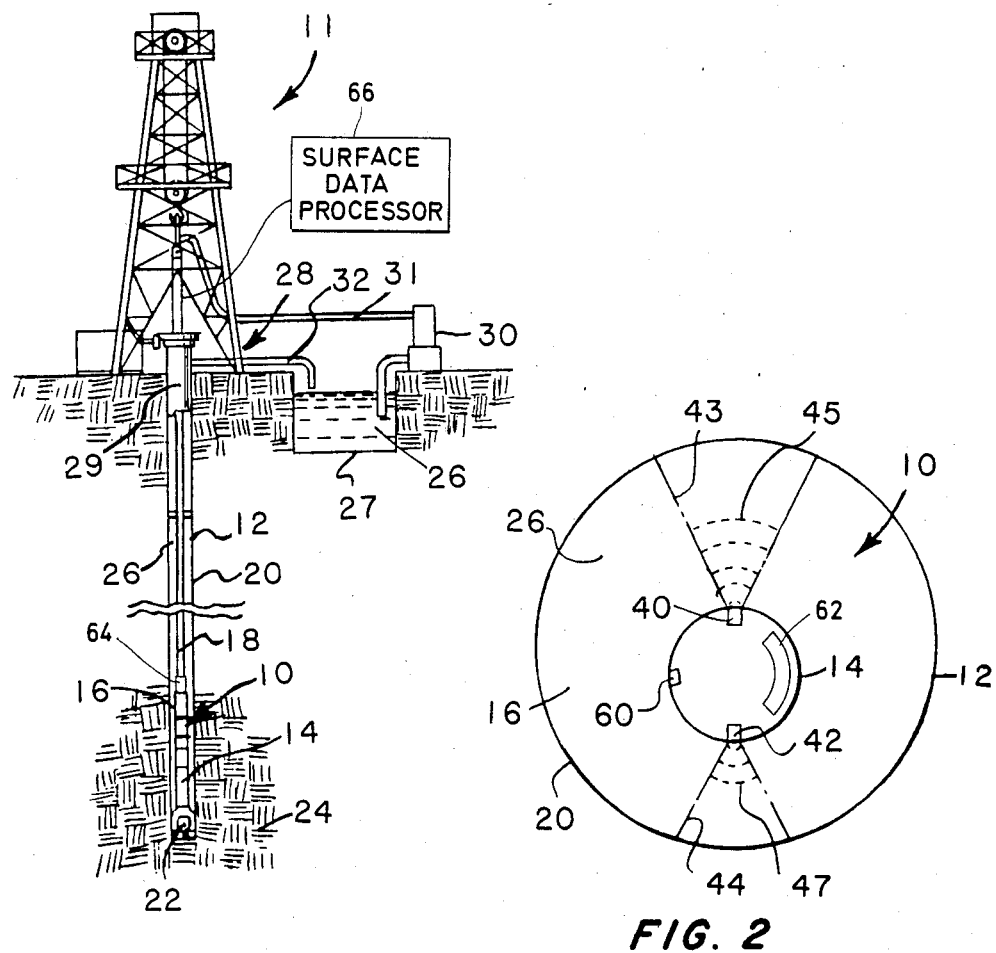
FIG. 1
FIG. 2
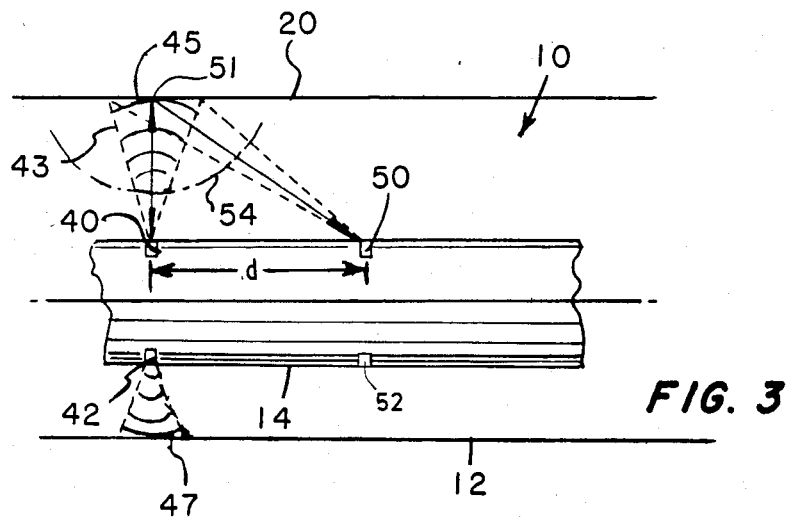
FIG. 3

SYSTEM FOR ACOUSTIC CALIPER MEASUREMENTS

BACKGROUND OF THE INVENTION

1. Field of the Invention

The invention relates to an acoustic tool for measuring reflectively within a borehole and, more particularly, to a caliper instrument for use in a measuring while drilling environment utilizing acoustic pulses transmitted within a borehole.

2. History of the Prior Art

It has long been recognized in the oil industry that the collection of downhole data during the drilling operation is of extreme value. Such information improves the efficiency of the drilling operation by providing critical data concerning downhole conditions. For example, it is desirable that a continuous record of borehole size be provided so that variations in borehole diameter as a function of depth may be recorded for analysis in connection with the operation of oil wells and the like.

Acoustic well logging is also used in the geophysical and seismic arts to provide surveys of the various formations traversed by the borehole. In particular, acoustic velocity measurements provide valuable information concerning the type of rocks and the porosity thereof in the formation surrounding the borehole. The most commonly measured acoustic parameter in the field of well logging has been the velocity of compression waves. The velocity of shear waves and acoustic impedance have also been of value in determination of both the formation characteristics and the fluid environment.

A myriad of acoustic logging systems for downhole measurements are available in the prior art. One of the most critical measurement parameters of such acoustic logging systems is the acoustic velocity in the the fluid through which the acoustic pulse is transmitted. A high degree of resolution in the interpretation of pulse data is only possible with a precise knowledge of the acoustic velocity in the medium of measurement. Moreover, a high degree of resolution is necessary for the accurate identification of various formation strata as well as other critical borehole parameters.

Many prior art attempts to provide accurate acoustic logging instrumentation have encountered serious problems due to the downhole environment. For example, the drilling operation necessitates the flow of high pressure drilling mud which is pumped down through a central bore in the drill pipe, out through apertures in the drill bit and back to the surface through the annular space between the drill pipe and the side walls of the borehole. The mud removes drill bit cuttings and the like and can reveal much information about the formation itself. Such a fluid system, by definition, includes wide variations in drilling mud density and character both along the borehole as well as in a direction across the borehole annulus. For example, gas present in the drilling fluid has a direct bearing on acoustic velocity within the fluid and the presence of gas varies with position and pressure within the borehole.

One prior art technique of determining acoustic velocity includes sampling the drilling mud at the wellhead for purposes of measurement. However, such a measurement cannot accurately reflect the varying conditions of the mud downhole where the acoustic measurements are actually made. Downhole acoustic pulse data is generally generated by acoustic transducers disposed within the side walls of a sub secured above an operating drill bit within the borehole. The acoustic pulses are transmitted from the sub to the sidewalls of the borehole through the drilling fluid and the reflection time thereof is monitored. The presence of gas or cuttings within the fluid as well as downhole pressures and turbulence thus has a direct bearing on the acoustic velocity and the reflectivity measurements. However, the most convenient location for measuring acoustic velocity is at the wellhead in the passive fluid collection area where the dynamic turbulent downhole conditions are not present. In addition, once received from the borehole, the drilling mud is generally allowed to settle and/or is passed through an out-gassing unit prior to its collection and recirculation. This step drastically alters the acoustic velocity parameters of the drilling fluid from its downhole gaseous and turbulent condition and leads to inaccuracies in the interpretation of the downhole acoustic reflectivity measurements.

A prior art method of overcoming the problems of accurate data collection in a measuring-while-drilling environment is the recording of acoustic borehole measurements with a wireline logging tool. Such tools are utilized with the drill string removed from the borehole and the drilling mud being in a settled state. Such a condition lends itself to a more homogeneous configuration and the presence of mud cakes and turbulence related to nonhomogeneous regions are generally eliminated. One such acoustic caliper logging device is set forth and shown in U.S. Pat. No. 3,835,953 to Summers wherein a wire line tool is provided for positioning within a borehole. A transducer unit repeatedly generates an acoustic pulse as the transducer system is rotated to scan the walls of the borehole in a full circle. A scan of between 1 and 10 revolutions per second may be provided with the tool itself being generally centered within the borehole. The reflections of acoustic energy from the borehole wall are then from a small, centralized area whereby the system can be highly definitive of the character of the wall. Such information is obviously useful in an analysis of the borehole configuration. One distinct disadvantage is, however, the necessity of pulling the drill string from the borehole for utilization of the wireline tool. This operation is both time consuming and expensive from the standpoint of the drilling operation.

In addition, prior art wireline acoustic parameter measurement techniques have obtained acoustic velocity at a downhole location but the acoustic path over which the velocity measurements are made is different from the path over which the parameter is measured. For example, an acoustic caliper measurement made across a borehole annulus which relies on acoustic velocity data obtained in a direction parallel to the borehole axis will not be precise because of the nonlinearity of the flow pattern and flow densities across the borehole.

It would be an advantage, therefore, to overcome the problems of the prior art by providing detailed acoustic caliper information of a borehole in a measuring while drilling configuration. This gives the driller immediate feedback as to the quality of the borehole being drilled and can be used to infer insitu stresses. The method and apparatus of the present invention provide such a system by utilizing a series of acoustic transceivers disposed both laterally and longitudinally upon a drill string sub for use in a measurement while drilling mode. The acoustic transceivers further measure the drilling fluid acoustic velocity simultaneously with the measurement of distance, in the same location in the borehole as the desired distance measurement and along a portion of the same acoustic path as the distance measurement. This provides acoustic reflectivity data based upon an acoustic velocity measurement and a distance measurement generated with a common acoustic pulse. In this manner the accuracy of the data is much higher and more reliable than conventional prior art techniques.

SUMMARY OF THE INVENTION

The present invention relates to a method of and apparatus for making acoustic measurements within a borehole. More particularly, one aspect of the invention includes an acoustic caliper tool for use in a measuring while drilling environment within a borehole of the type utilizing at least one acoustic transceiver disposed within a section of a drill string. The acoustic transceiver is adapted for generating an acoustic pulse and reflecting that pulse off the side wall of the borehole for determination of the period of time in which the acoustic pulse requires for return propagation. A second acoustic receiver is disposed longitudinally of the first transceiver a selected distance for receiving a portion of the acoustic pulse generated by the transceiver. The pulse sensed by the second receiver is determinative of the acoustic velocity of the borehole fluid through which the pulse has propagated since the distance between the second receiver and the transceiver is known.

In another aspect the invention includes apparatus for measuring reflectivity of the side walls of a borehole by transmitting a series of acoustic pulses and receiving acoustic energy reflected from the walls of the borehole in timed relation to pulse transmission which is dependent upon borehole diameter. The apparatus comprises a housing adapted for securement within a drill string for performing acoustic measurements in a measuring-while-drilling mode. Means are disposed within the housing for generating and receiving an acoustic pulse propagated toward and reflected from the side wall of the borehole. A second receiving means is longitudinally disposed along the housing from the pulse generation means for receiving the acoustic pulse generated therefrom and reflected from the side wall of the borehole. Means are provided for processing the data produced by the receivers within the borehole along with means for transmitting the data to the wellhead. Comparison means are provided for comparing acoustic pulse travel time data to determine the difference in time between receipt of the transmitted acoustic pulse by the first and second receiving means. Distances within the wellbore as a function of the travel time of the acoustic energy are then calculated.

In another aspect, the invention includes the aforesaid measuring apparatus wherein the housing also includes an inclinometer disposed therein for producing data relative to borehole orientation. A second acoustic transceiver is also provided and disposed within the housing, and azimuthally spaced from the first, for generating and receiving an acoustic pulse simultaneously with the first transceiver means. Control means are incorporated to actuate the plurality of transceivers in a predetermined repetitive sequence. Another aspect of the invention includes means for producing the acoustic pulses at different selected frequencies and pulse widths.

In yet another aspect, the invention includes a method of measuring a distance within a borehole through the propogation of acoustic energy from a housing disposed as part of a drill string. The method comprises the steps of providing first acoustic pulse generating and receiving means disposed within the housing and providing second acoustic pulse receiving means longitudinally disposed from the first receiving means. An acoustic pulse is generated with the pulse generating means and reflected from the side wall of the borehole. A first portion of the acoustic pulse is received with the first receiving means, and a second portion of the acoustic pulse is received with the longitudinally disposed second receiving means. The time intervals for pulse propagation between the pulse generating means, the borehole wall and the first receiving means, on the one hand, and between the pulse generating means, the borehole wall and the second pulse receiving means on the other hand are measured. The distance between the pulse generating means and the borehole wall is determined as a function of the pulse propagation time intervals and distance between the first and second receiving means.

BRIEF DESCRIPTON OF THE DRAWINGS

For a more complete understanding of the present invention and for further objects and advantages thereof, reference may now be had to the following description taken in conjunction with the accompanying drawings in which:

FIG. 1 is a diagrammatic, side-elevational view of a borehole drilling operation illustrating the use of an acoustic caliper tool in accordance with the principles of the present invention;

FIG. 2 is a top plan, schematic view, of the apparatus of the present invention illustrating a pair of acoustic transceivers reflecting acoustic pulses from the sidewalls of a borehole; and FIG. 3 is a side elevational, diagrammatic illustration of one embodiment of an acoustic caliper tool constructed in accordance with the principles of the present invention.

DETAILED DESCRIPTION OF THE PREFERRED EMBODIMENT

Referring first to FIG. 1, there is shown a drilling rig 11 disposed atop a borehole 12. A first embodiment of an acoustic caliper tool 10 constructed in accordance with the principles of the present invention is carried by a sub 14 incorporated into a drill string 18 and disposed within the borehole 12. The system 10 is provided for the continuous measurement of acoustic velocity and distance within the annular region 16 defined between the sub 14 and the borehole sidewalls 20. A drill bit 22 is located at the lower end of the drill string 18 and carves a borehole 12 through the earth formations 24. Drilling mud 26 is pumped from a storage reservoir pit 27 near the wellhead 28, down an axial passageway through the drill string 18, out of apertures in the bit 22 and back to the surface through the annular region 16. Metal casing 29 is positioned in the borehole 12 above the drill bit 22 for maintaining the integrity of the upper portion of the borehole 12.

Still referring to FIG. 1, the annular 16 between the drill stem 18, sub 14 and the sidewalls 20 of the borehole 12 forms the return flowpath for the drilling mud. Mud is pumped from the storage pit 26 near the well head 28 by a pumping system 30. The mud travels through a mud supply line 31 which is coupled to a central passageway extending throughout the length of the drill string 18. Drilling mud is, in this manner, forced down the drill string 18 and exits into the borehole through apertures in the drill bit 22 for cooling and lubricating the drill bit and carrying the formation cuttings produced during the drilling operation back to the surface. A fluid exhaust conduit 32 is connected from the annular passageway 16 at the well head for conducting the return mud flow from the borehole 12 to the mud pit 26 as shown in FIG. 1. The drilling mud is typically handled and treated by various apparatus (not shown) such as outgassing units and circulation tanks for maintaining a preselected mud viscosity and consistency. It may be seen that measurements of acoustic velocity of the drilling mud at or within the drilling pit 26 would thus be affected by the treated and stagnant condition of the mud.

The position of the acoustic caliper tool 10 upon the drill sub 14 relative to the borehole walls 20 will vary during rotation. The drill string 18 may be rotated for imparting the requisite cutting action to the drill bit 22 and, during rotation, the drill string 18 often rubs against the walls of the borehole 12. Such rubbing results in mis-alignments and the non-centralized positioning of the acoustic caliper tool 10 relative to the borehole walls 20. The measurement of distances with the tool 10 by means of acoustic pulses which are reflected from the borehole walls 20 must therefore be extremely precise in order to produce data which accurately depicts the dimensions and shape of the borehole. This precision of measurement must also be maintained in view of the presence of gas, formation cuttings and non-homogeneous fluid flow conditions as is typical in most drilling operations. Moreover, dimensions of non-uniform borehole cross-sections must be measured as well as the variations in acoustic reflectivity which are indicative of different formation materials.

The method and apparatus of the present invention provide a system capable of producing data of an accurate and reliable nature indicative of borehole shape and size by utilizing a common acoustic pulse for both the determination of acoustic velocity within the turbulent flow of non-homogeneous drilling fluid in the borehole annular as well as the distance between the sub 10 and the borehole wall 20. In this manner, all distance measurements will utilize the actual acoustic velocity of the fluid medium through which the distance measurements are made.

Referring now to FIG. 2, there is shown an enlarged, top plan schematic view of one embodiment of the acoustic caliper 10 constructed in accordance with the principles of the present invention. The tool 10 comprises first and second transceivers 40 and 42 disposed within the sidewalls of the sub 14. As used herein an acoustic transceiver comprises a single acoustic transmitter and a single acoustic receiver generally constructed in the same device. Focused acoustic energy radiation patterns 43 and 44 are illustrated propagating from the acoustic transceivers 40 and 42, respectively. An acoustic pulse 45 is thus shown propagating from transceiver 40 within radiation pattern 43. An acoustic pulse 47 is likewise shown propagating within radiation pattern 44 from transceiver 42. The acoustic pulses 45 and 47 are directed toward the sidewalls of the borehole 20 and are reflected therefrom back to the transceivers 40 and 42 where they are detected by the receiving means incorporated into each transceiver. The travel time which the acoustic pulses 45 and 47 require for reflection and return to transceivers 40 and 42, respectively, is a determination of the distance between the transceivers and the borehole wall. However, an interpretation of acoustic pulse travel time delay data requires a determination of the acoustic velocity of the drilling fluid 26 disposed within the annulus 16 of the borehole 12. Due to the non-homogeneous nature of the fluid flow pattern as well as the presence of gas and earth cuttings in the fluid, the acoustic velocity through the fluid will vary with time as well as distance. Thus, the required time for propagation and return of acoustic pulses 45 and 47 will also vary. By also utilizing the same acoustic pulses 45 and 47 to determine both distance measurements as well as acoustic velocity of the fluid medium 26 through which the distance measurement is made, the distance determination will be both inherently accurate and reliable. Moreover, the data produced during the measurement process will also be an accurate indication of drilling mud conditions at the location of acoustic caliper measurement.

Referring now to FIG. 3, there is shown an enlarged side elevational, schematic view of the acoustic caliper tool 10 constructed in accordance with the principles of the present invention. Transceivers 40 and 42 are shown secured to the sub 14 along a common azimuthal plane. A third acoustic device 50 is shown secured to the sub 14 and disposed longitudinally relative to transceiver 40 a known selected distance "d". The acoustic device 50 may be either a transceiver or simply a second acoustic receiver for sensing the reception of acoustic pulses 45 propagated from the transceiver 40.

Still referring to FIG. 3, it may be seen that an acoustic pulse 45 propagated from transceiver 40 will engage the side wall 20 of the borehole 12 and be reflected therefrom and received by both the first receiver forming part of the transceiver 40 and by the second receiver 50. The radiation pattern 43 of acoustic pulse 45 is thus schematically shown with the pulse contacting the side wall of the borehole 20 at a point 51. The pulse 45 is thereafter reflected back toward transceiver 50 as a reflection pulse 54. Because the distance between transceiver 40 and reflection point 51 is less than the distance between the second receiver 50 and point 51 the pulse 54 will arrive at transceiver 40 first. The difference between the time when the pulse 54 to arrives at the first receiver of transceiver 40 and when the pulse 54 arrives at the second receiver 50 is determinative of the distance between the transceiver 40 and point 51 on the borehole wall. This distance becomes a geometric function since the distance between the transceiver 40 and the receiver 50 is known.

Referring still to FIG. 3, it may be seen that the distance between transceiver 40 and receiver 50 is a design parameter. Optimal distance will, of course, be a function of the geometries involved in the measurement. Utilization of conventional geometric formulation relative to the distances and times involved and the application of differential equations will permit maximization of the desired resolution. The distance between transducer 40 and receiver 50 is thus selected to obtain resolutions which are both useful and feasible considering downhole conditions.

The present invention contemplates the use of a single transmitter and first receiver 40 and a second receiver 50 longitudinally disposed therefrom. In order to compensate for non co-axial positioning of the tool within the borehole and/or whipping of the drill string 18 which is common during a drilling operation, a plurality of transceivers 40 and 42 are preferable. In such a configuration, both the transceivers would be pulsed simultaneously while only one would be needed to measure an acoustic velocity in conjunction with a second receiver 50. However, if desired, each transceiver 40 and 42 could be coupled to an associated second receiver e.g., 50 and 52, respectively, longitudinally spaced therefrom for its own calibration to allow for acoustic velocity variations in the borehole fluid transmission media at different azimuthal positions in the borehole annulus. Such a configuration would account for non-homogeneous mud flow which could cause errors in the distance measurements. In essence, the use of a single acoustic wave 45 for both measuring distance and acoustic velocity is a distinct advantage which may be preferable for any transceiver array.

In operation, the acoustic transceivers 40 and 42 are disposed upon a drill collar or downhole sub 14 with a longitudinally disposed reference receiver 50 for insitu measurement of the acoustic velocity of the drilling mud 26 within the annulus 16 of the borehole 12. Insitu measurement utilizing a common acoustic pulse 45 is inherently more accurate than pulse systems using separate pulses for acoustic velocity determination and distance determination within the borehole. Such an operation is only possible with a transducer configuration adapted for withstanding the vibrations encountered during downhole drilling operations and of a configuration which will reduce the effects of reflections from cuttings in the drilling mud. For this reason, the azimuthally disposed transceivers 40 and 42 and longitudinally disposed reference receiver 50 are preferably recessed within the sub 14 to provide a smooth outer wall as shown in FIGS. 2 and 3. The transducers may also be mounted in the drill collar in select configurations for reducing "ringing" of the acoustic waves within the drill collar. A shaped transducer configuration has been shown to reduce these internal reflections.

It may be seen from the above that insitu caliper measurements utilizing the system 10 of the present invention necessitates only time interval measurements. Generally azimuthally spaced measurements may be averaged to obtain an average diameter of the borehole 12 when a single transducer 40 is utilized in conjunction with a receiver 50. A dual or triple transducer array will, of course, give much more accurate and readily utilizable sizing of the borehole 12 in situations where the sub 14 is not co-axial within the borehole.

Multiple transducer arrays are of particular concern during acoustical investigation of the subleties of borehole wall construction wherein the acoustic energy reflected from the formation along the side walls of the borehole 20 depends upon the acoustic impedance and surface characteristics of the formation. Surface roughness and impedance mismatch, as well as formation chips and formation surface characteristics will attenuate the acoustic pulse although the time frame will remain constant. The attenuation affects in the acoustic pulse thus represents the reflectivity of the surface from which the pulse is reflected. By utilizing an inclinometer angle or azimuthal position sensor 60 as schematically represented in FIG. 2, the reflectivity data may be further refined to define one period of rotational data for purposes of analysis. The data collected from a second period of rotation may then be collected and stored in the memory of a microprocessor system 62 for subsequent processing or transmission to surface processing or comparator means 66 by any conventional borehole telemetry system, e.g., by mud pulse telemetry sub 64. In this manner, one set of borehole data may be processed while a second set of data is being taken during another rotational cycle.

It has thus been shown that a transceiver array capable of high resolution will be effective in producing not only a clear picture of borehole configuration but other downhole parameters as well. Because of the rotation of the drill string 18 repetitive data will be produced indicative of changes in the borehole but also capable of monitoring parameters defining the flow of drilling mud 26 within the annulus 16. For example, the presence of gas and earth cuttings within the drilling fluid 26 will have obvious effects upon the reflectivity of the fluid which may be determined by an appropriate filtering system. In the same manner the roughness of the borehole may likewise be determined by measuring the degree of reflection at the same time an insitu measurement of velocity is completed.

The method and apparatus of the present invention will also provide MWD data about actual formation properties within the borehole in addition to that discussed above. By utilizing relatively high frequencies (1 to 3 MHz) of acoustic pulses an operator can filter out the relatively low frequency mechanical noises generally encountered during a drilling operation. Pulsing the array at different frequencies will also provide additional data and inherent filtering. For example, utilizing different pulse widths and pulse rates can provide surface roughness information because roughness reflections depend upon the size of the roughness particles relative to wave lengths and therefore the use of different frequencies provides more accurate data.

It is thus believed that the operation and construction of the present invention will be apparent from the foregoing description. While the method and apparatus shown and described has been characterized as being preferred, it will be obvious that various change and modifications may be made there in without departing from the spirit and scope of the invention as defined in the following claims.

What is claimed is:

1. A method of calipering a borehole through the propagation of acoustic energy from a measurement device suspended within the borehole, comprising the steps of:

providing a first acoustic pulse transceiver disposed within a housing, said transceiver comprising a first transmitter and adjacent first receiver;

providing a second acoustic pulse receiver within said housing and spaced longitudinally from said first receiver a known distance;

generating a first acoustic pulse directed toward the side wall of said borehole with said first transmitter;

receiving a first reflected portion of said first acoustic pulse with said first acoustic pulse receiver, said first reflected portion having been reflected from the surface of said borehole without having been refracted therein;

receiving a second reflected portion of said first acoustic pulse with said longitudinally spaced second acoustic pulse receiver, said second reflected portion having been reflected from the surface of said borehole without having been refracted therein;

providing a second acoustic pulse transceiver comprising a second transmitter and an adjacent third receiver within said housing, said second transceiver azimuthally disposed from said first transceiver;

generating a second acoustic pulse directed toward the side wall of said borehole with said second transmitter at the same time said first transmitter is generating said first acoustic pulse;

receiving a reflected portion of said second acoustic pulse with said third acoustic pulse receiver, said reflected portion of said second acoustic pulse having been reflected from the surface of said borehole without having been refracted therein;

measuring the time interval for pulse propagation of said first reflected portion between said first transmitter, said borehole wall and said first acoustic pulse receiver;

measuring the time interval for pulse propagation of said first reflected portion between said first transmitter, said borehole wall and said second acoustic pulse receiver;

measuring the time interval for pulse propagation of said reflected portion of said second acoustic pulse between said second transmitter, said borehole wall and said third receiver; and determining distances within said borehole as a function of said measured time intervals and said known distance between said first acoustic pulse receiver and said second acoustic pulse receiver.

2. The method as set forth in claim 1 and also including the steps of providing an inclinometer disposed within said housing and producing data from said inclinometer relative to borehole orientation.

3. The method as set forth in claim 1 and further including the step of providing control means to actuate said plurality of transmitters and receivers in a predetermined repetitive sequence.

4. The method as set forth in claim 1 and further including the step of producing said acoustic pulses at a plurality of selected frequencies and pulse widths to obtain data relative to a common area of said borehole with acoustic energy having different characteristics.

* * * * *

UNITED STATES PATENT AND TRADEMARK OFFICE
CERTIFICATE OF CORRECTION

PATENT NO.   : 4,665,511
DATED        : May 12, 1987
INVENTOR(S)  : Paul F. Rodney et al It is certified that error appears in the above-identified patent and that said Letters Patent are hereby corrected as shown below:

Column 9, line 20, delete "first", first occurrence, and insert therefor --second--.

Signed and Sealed this

Eighteenth Day of August, 1987

Attest:

DONALD J. QUIGG

Attesting Officer

Commissioner of Patents and Trademarks